T. SCHELL.
POULTRY FOUNTAIN AND HEATER THEREFOR.
APPLICATION FILED MAY 5, 1919.
1,343,010.
Patented June 8, 1920.
2 SHEETS—SHEET 2.
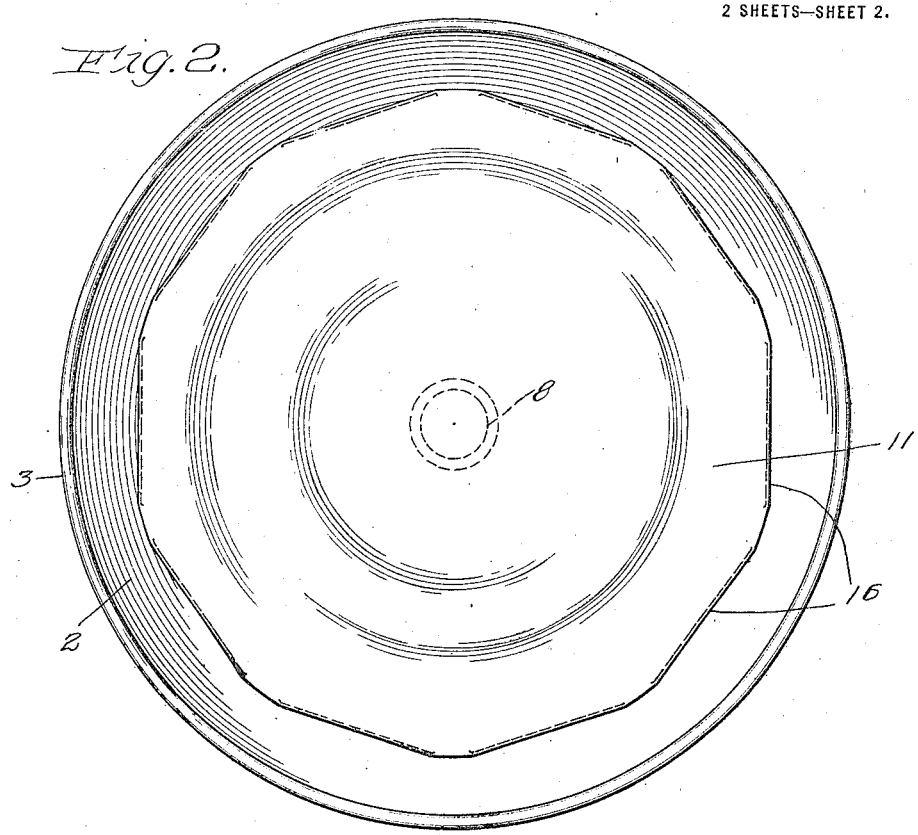
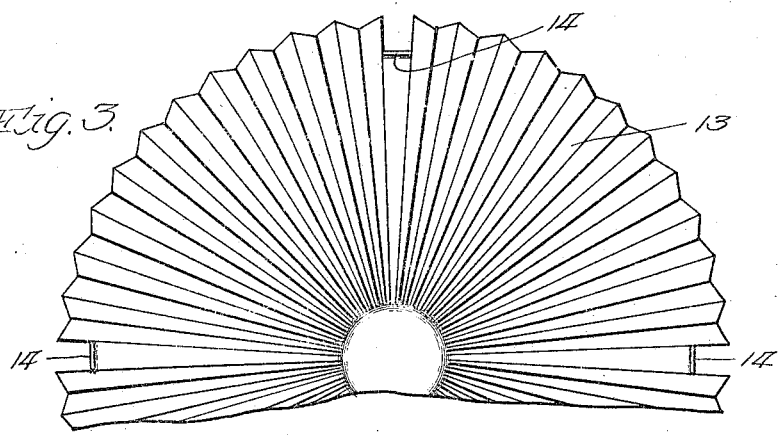
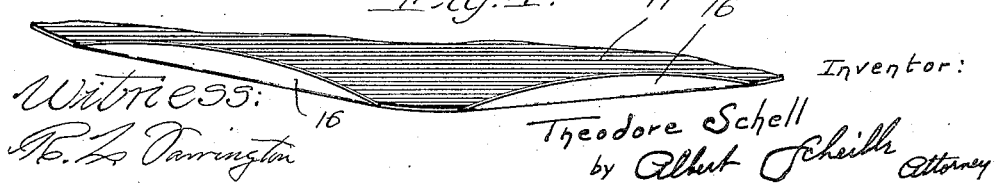

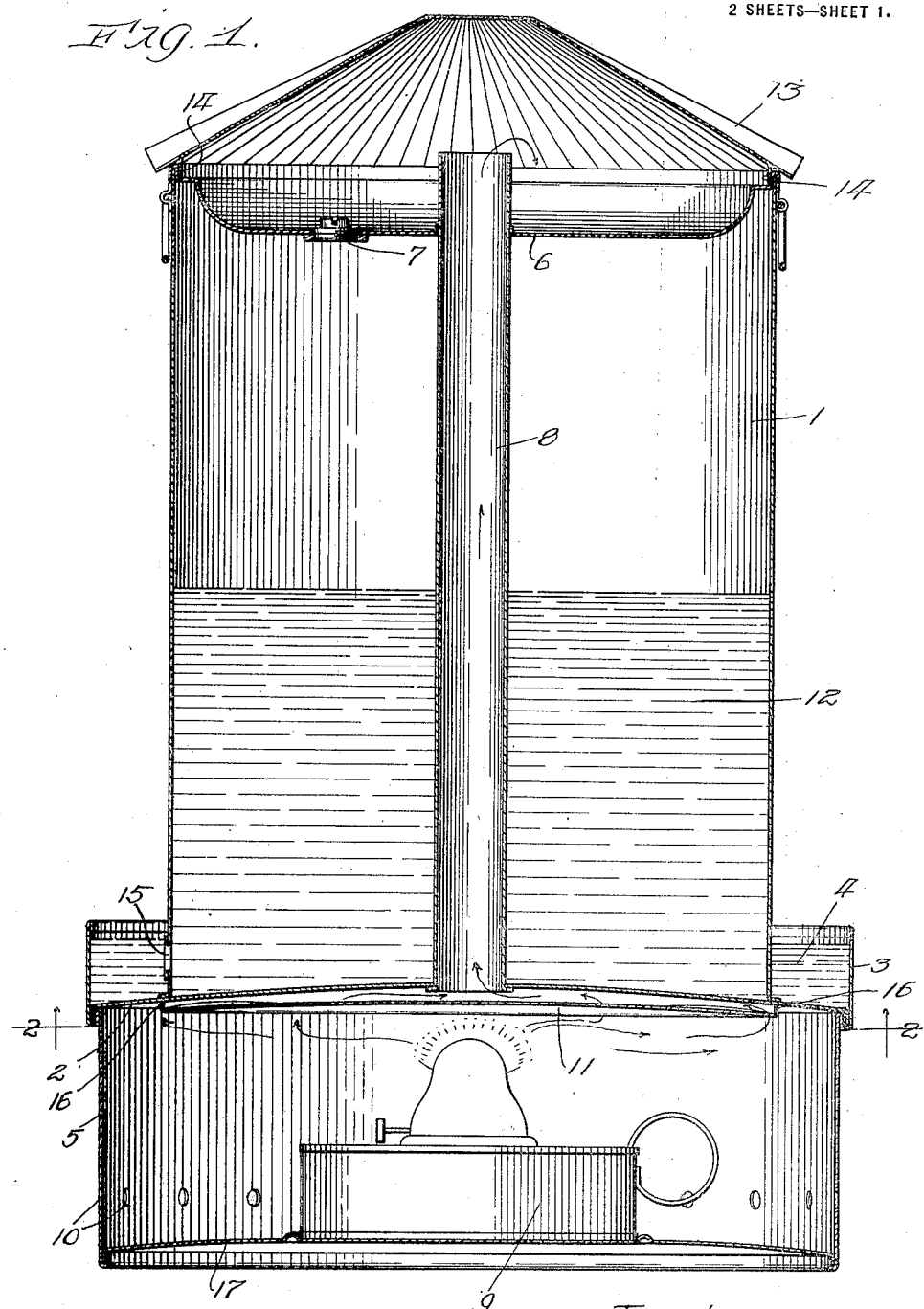

UNITED STATES PATENT OFFICE.

THEODORE SCHELL, OF MACOMB, ILLINOIS, ASSIGNOR TO AMERICAN STEEL PRODUCTS CO., OF MACOMB, ILLINOIS, A CORPORATION OF ILLINOIS.

POULTRY-FOUNTAIN AND HEATER THEREFOR.

1,343,010. Specification of Letters Patent. Patented June 8, 1920.

Application filed May 5, 1919. Serial No. 294,930.

*To all whom it may concern:*

Be it known that I, THEODORE SCHELL, a citizen of the United States, residing at Macomb, Illinois, have invented certain new and useful Improvements in Poultry-Fountains and Heaters Therefor; and I do hereby declare the following to be a full, clear, and exact description of the invention, such as will enable others skilled in the art to which it appertains to make and use the same.

My invention relates to poultry fountains, and in its general aspects aims to provide a fountain equally suitable for summer and winter use, and one in which the water can readily be warmed in cold weather with a quite small expenditure of fuel. More particularly, my invention aims to provide a simple poultry fountain which will automatically maintain the supply of water at a predetermined level, which can easily be filled, and which can either be set directly on the ground or set over a lamp-carrying base. Furthermore, my invention aims to provide a heater base adapted to support and to interlock with such a poultry fountain, and to provide means for causing the hot air currents to traverse the base of the fountain, so as to compel an effective distributing and utilizing of the available heat. Considered more in detail, my invention aims to equip a poultry fountain with means for compelling the heated air together with the combustion products of a lamp to travel across the entire bottom of the fountain and thereafter to pass through a chimney extending through the fountain, thereby effectively warming both the accessible drinking water and the available supply of water. With this last named object in view, my invention aims to provide simple and cheaply constructed heat-deflecting means so arranged as to direct the current of hot gases first to the drinking trough, and thereafter to cause these gases to pass radially inward across the bottom of the supply tank for warming the latter, and finally to pass up a center tube through the supply tank for imparting additional heat to the latter. My invention also aims to provide simple and cheap heat-deflecting means and a simple mounting for the same. Still further objects will appear from the following specification and from the accompanying drawings, in which—

Figure 1 is a central and vertical section through a poultry fountain and heater embodying my invention.

Fig. 2 is a horizontal section through the same, looking upward from the line 2—2 of Fig. 1.

Fig. 3 is a fragmentary plan view of the same.

Fig. 4 is a view of an edge portion of the heat deflector, showing the method of constructing the latter.

Referring first to the fountain proper, this consists of a cylindrical casing 1 having a bottom 2 which projects radially beyond the cylindrical casing 1 and which thereafter is turned upward to afford an edge 3 spaced from the casing 1, thereby affording an annular trough for retaining the accessible supply of drinking water 4. The bottom of the fountain is desirably flanged downwardly at its juncture with the ledge 3, substantially as shown in Fig. 1, thereby affording a rigid and downwardly directed flange for supporting the fountain when set directly on the ground, and which flange is also adapted to telescope over the upper end of a cylindrical heater box 5. At its upper end, the fountain proper has a head 6, which is desirably dished downwardly and which has a threaded opening closed by a plug 7. Extending upwardly through the center of the fountain is a chimney 8 which provides an outlet for the hot air and combustion products from a lamp 9 disposed within the heater casing and desirably located along the central axis of my appliance, or directly under the chimney 8.

The air supply for the lamp is afforded through openings 10 in the side of the heater casing, and the hot gases due to the lamp would normally tend to pass directly upward from the latter through the chimney 8, thereby imparting only a small portion of the heat to the supply tank and reaching the water 4 in the trough only very indirectly. To utilize the heat more effectively, I interpose between the lamp and the bottom 2 of the fountain proper a heat deflector 11 spaced from the bottom 2 by a relatively small distance. This deflector compels the upward current of hot gases from the lamp first to travel radially outward along the bottom of the deflector, and then to pass radially inward between the deflector and the bottom 2 to the lower end of the chimney 8. In other words, the current traverses substantially the paths indicated by the arrows in Fig. 1, thus heating the drinking water 4 and conveying a large proportion of the heat to the supply water 12 in the fountain through the bottom 2 of the latter. Then further heat is conducted to the water in the fountain from the hot gases while passing up the chimney and while passing outwardly between the top 6 of the fountain and the cover 13. This cover is desirably corrugated radially, as shown in Fig. 3, and desirably has a number of fingers 14 bent downwardly from it as shown in Fig. 1. These fingers rest on the top 6 of the fountain proper and telescope inside the outer rim of the latter, thus constituting a simple method of holding the cover in position without requiring fastenings of any kind. Consequently, the cover can readily be lifted off at any time to afford access to the plug 7 for replenishing the supply of water.

For operation, the outlet 15 is plugged temporarily by means of a cork while the fountain is filled with water to any desired extent through the opening closed by the plug 7. When the plug 7 is tightly replaced and the cork is withdrawn water will first flow through an opening 15 from the fountain proper into the trough surrounding the lower portion of the latter, but as soon as the level of the water in this trough extends above the top of the outlet 15, the water 4 will form a liquid seal, causing the supply of water in the fountain to be retained therein by the pressure of the outer air on the water in the trough. When the water in the trough is consumed or evaporated sufficiently to lower this level below the top of the opening 15, air will be admitted through this opening into the fountain, thus permitting the water in the trough to be replenished by some of the water which ordinarily is held above the trough by the pressure of the outside air. Thus arranged, the fountain may readily be set directly upon the ground, with the lower ends of the annular ledge 3 acting as a support and with the water 4 in the trough accessible for young chicks.

In cooler weather, the fountain is set upon the base as shown in Fig. 1, the lamp having first been lighted, and the lamp then affords a slow but effective distribution for warming the water in the trough to a temperature suitable for drinking by the chickens, and also for keeping the added supply in the fountain from freezing. Moreover, the gases escaping at the edge of the hood 13 are still warm, so that the heated appliance also acts to some extent as a heater for the chicken coop.

As a simple method of constructing the heat deflector, I desirably employ a disk of sheet metal having peripheral portions 16 turned up and soldered or welded to the bottom 2 of the fountain, and it is desirable to dish both the deflector and the bottom of the fountain upwardly to enhance the draft of the chimney through the passage between these parts. I also desirably arch the bottom 17 of the heater casing upwardly, so as to raise the lamp off the floor and avoid fire risks in case the appliance is set on a wooden floor. Likewise, I desirably dish the top 6 of the fountain downwardly and allow the chimney to project considerably above this, thereby forming a sort of funnel into which water may be poured from a bucket if a hose or hydrant is not convenient for the filling.

However, while I have illustrated and described my appliance in a desirable embodiment, I do not wish to be limited to the particular details of construction and arrangement here disclosed, it being obvious that the same might be varied in many ways without departing from the spirit of my invention. Neither do I wish to be limited to the use of my appliance for the watering of chickens, as the same could obviously be used for other purposes, as for example in a larger form for the watering of hogs or other animals.

I claim as my invention:

1. In a drinking fountain, a base having air openings, a heater in the base, a water tank on the base having a trough which overlies the base, a chimney in the tank extending through the bottom thereof, and a heat deflector extending over the lower end of the chimney and spaced from the bottom of the tank and also spaced at its periphery from the side walls of the base whereby the heat will be first laterally deflected and will impinge against the bottom beneath the trough and in said space between the side walls of the base and the deflector periphery and will then pass over the deflector and under the tank bottom and enter the chimney.

2. In a drinking fountain, a base, a heater therein, a water tank on the base having a trough, a chimney in the tank extending through the bottom thereof, and a heat deflector extending over the lower end of the chimney and spaced from the bottom of the tank and also spaced at its periphery from the side walls of the base whereby the heat will first be laterally deflected and will then pass up through the space between the deflector periphery and the side walls of the base and against the tank bottom and will then pass in the space between the tank bottom and the deflector and enter the chimney.

3. In a drinking fountain, a base, a heater therein, a water tank on the base having a trough, a chimney in the water tank extending through the bottom thereof, and heat deflector means in the base spaced below the tank bottom and from the outer walls of the base whereby heat from the heater will impinge against the center of the deflector bottom and travel along the latter and upwardly beyond the margin of the deflector to impinge against the trough bottom and will then travel inwardly in the space between the deflector and tank bottom and finally enter the chimney.

4. In a drinking fountain, a water tank having a dished top, a chimney extending through and above the top, a heater, and a top having fingers depending therefrom and engaged within the marginal rim of the top and seated at their lower ends on said top.

5. In a drinking fountain, a base, a heater therein, a water tank on the base having a trough and having its bottom dished upwardly, a chimney in the tank extending through the bottom thereof, and a heat deflector dished upwardly and extending over the lower end of the chimney and spaced from the bottom of the tank and also spaced at its periphery from the side walls of the base whereby the heat will first be laterally deflected and will then pass up through the space between the deflector periphery and the side walls of the base and against the tank bottom and will then pass in the space between the tank bottom and the deflector and enter the chimney, said deflector having spaced edge portions turned upwardly and secured to the bottom of the tank.

6. In a drinking fountain, a base having air openings, a heater in the base, a water tank on the base having a trough, the bottom of the tank and the bottom of the trough overlying the base, a chimney in the tank extending through the bottom thereof, and a heat deflector extending over the lower end of the chimney and spaced from the bottom of the tank and also spaced at its periphery from the side walls of the base and from the bottom of the trough whereby the heat will be first laterally deflected and will impinge against the trough bottom and will then pass over the deflector and under the tank bottom and enter the chimney.

Signed at Macomb, Illinois, April 26th, 1919.

THEODORE SCHELL.